United States Patent [19]
Slotkowski

[11] 3,916,210
[45] Oct. 28, 1975

[54] CIRCUIT FOR CONTROLLING A SEATBELT RETRACTOR

[75] Inventor: Kenneth G. Slotkowski, Southfield, Mich.

[73] Assignee: Ford Motor Company, Dearborn, Mich.

[22] Filed: June 10, 1974

[21] Appl. No.: 478,024

[52] U.S. Cl. ............................ 307/10 SB; 180/82 C
[51] Int. Cl.² ............................................ H02G 3/00
[58] Field of Search ................... 307/10 R, 10 SB; 200/61.58 B; 180/82 A, 82 C; 340/278; 242/107.12, 107.6

[56] References Cited
UNITED STATES PATENTS

| | | | |
|---|---|---|---|
| 3,632,059 | 1/1972 | Loose | 200/61.58 B |
| 3,742,448 | 6/1973 | Motz | 340/278 |
| 3,807,522 | 4/1974 | Becker | 180/82 C |

Primary Examiner—Robert K. Schaefer
Assistant Examiner—M. Ginsburg
Attorney, Agent, or Firm—Robert W. Brown; Keith L. Zerschling

[57] ABSTRACT

A circuit for controlling a seatbelt retractor of a motor vehicle. The retractor is of the type which permits initial withdrawal of the seatbelt from the retractor and which locks to prevent further seatbelt withdrawal upon decrease of the withdrawal force or upon slight retraction of the seatbelt. The control circuit prevents the locking of the seatbelt retractor if the vehicle is in a predetermined condition, such as its transmission lever being in a neutral or park position, and if the vehicle seating position for which the seatbelt retractor is provided is occupied. Prevention of retractor locking simplifies and eliminates annoyance to a vehicle occupant fastening the seatbelt about him.

8 Claims, 2 Drawing Figures

CIRCUIT FOR CONTROLLING A SEATBELT RETRACTOR

BACKGROUND

This invention relates to a circuit for controlling a seatbelt retractor.

Motor vehicles currently being manufactured or sold in the United States are equipped with seatbelt systems for restraining vehicle occupants in the event of a vehicle crash. These seatbelt restraint systems are equipped with seatbelt retractors which permit the withdrawal of the seatbelt from the retractor, against a spring force, but which lock and prevent further withdrawal of the seatbelt if the withdrawal force is decreased or if the seatbelt is allowed to be slightly retracted. Typically, such seatbelt retractors have a clutch mechanism which causes a locking bar to engage one or more teeth of a ratchet mechanism after initial withdrawal of the seatbelt from the retractor and a slight retraction thereof.

The locking of the retractor to prevent further withdrawal is necessary if the vehicle occupant using the seatbelt is to be restrained in the event of a vehicle crash. However, the locking of the retractor mechanism after initial withdrawal and decrease of the withdrawal force or slight retraction of the seatbelt can prove to be an annoyance to a vehicle occupant attempting to fasten the seatbelt about him and secure it to a suitable buckle. For example, if the occupant withdraws the seatbelt from the retractor and fails to extend the seatbelt sufficiently to reach the buckling mechanism before the retractor locks, then the occupant must allow the seatbelt to fully return to the retractor before he can once again attempt to fasten the seatbelt about him. Thus, it is desirable under certain circumstances to prevent the locking of the seatbelt retractor and to place the retractor in a free-wheeling condition. A mechanism for placing a locking retractor in a free-wheeling condition is described in U.S. patent application Ser. No. 478,023 entitled "Electromagnetically-Operated Free-Wheeling Retractor," filed June 10, 1974 in the name of Jeffrey A. Erion and assigned to the assignee to the present invention. The mechanism described in this patent application utilizes a solenoid which, when energized, prevents a locking bar in a seatbelt retractor from engaging the teeth of a ratchet. This renders the seatbelt retractor free-wheeling.

SUMMARY OF THE INVENTION

It is an object of the invention to provide an improved seatbelt system.

A further object of the invention is to provide a circuit for controlling a seatbelt retractor associated with a vehicle seatbelt system wherein the seatbelt retractor initially permits withdrawal of a seatbelt from the retractor and wherein the retractor includes means for preventing further withdrawal of the seatbelt upon decrease of the withdrawal force or upon slight retraction of the seatbelt.

Another object of the invention is to provide a control circuit which renders inoperable the means included within a seatbelt retractor for preventing, after initial seatbelt withdrawal, further withdrawal of the seatbelt.

Still another object of the invention is to place a vehicle seatbelt retractor in a free-wheeling condition under predetermined vehicle conditions, such as when a mechanism within the vehicle is in a predetermined condition, and a vehicle seating position, for which the seatbelt retractor is provided, is occupied. The means within the seatbelt retractor for preventing further seatbelt withdrawal may be rendered inoperative and the retractor rendered free-wheeling when a transmission switch, associated with a motor vehicle transmission which transmits motive force from the engine to the drive wheels of the vehicle, is in a predetermined condition, such as a "park" or "neutral" condition.

These and other objects of the invention may be better understood by reference to the detailed description which follows and to the drawing.

DETAILED DESCRIPTION

Figures 1, 2:
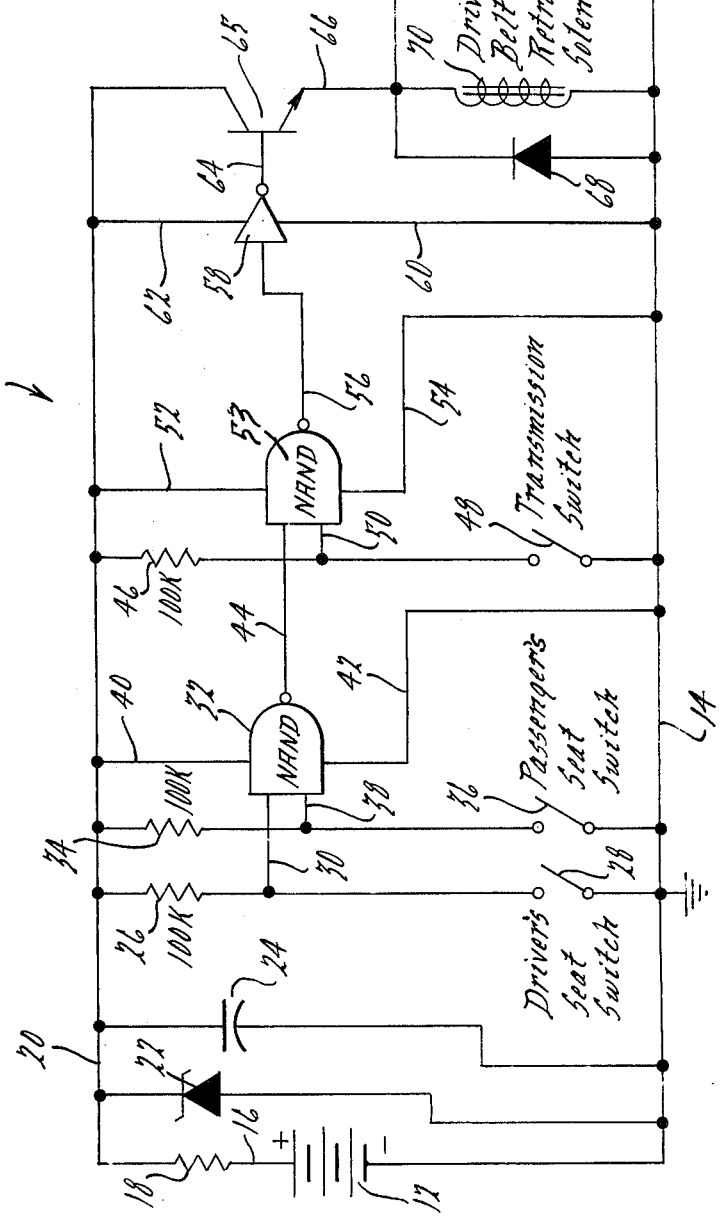
FIG. 1 is a schematic electrical diagram of a circuit for controlling a seatbelt retractor of the type that permits withdrawal of a seatbelt from the retractor and that includes means for preventing further withdrawal of the seatbelt from the retractor upon decrease of the withdrawal force or upon slight retraction of the seatbelt.
FIG. 2 is a truth table and associated note illustrating the operation of the circuit shown in FIG. 1.

With reference now to the schematic electrical diagram of FIG. 1, there is shown a control circuit generally designated by the numeral 10. The control circuit 10 is particularly suitable for use in a motor vehicle having a seatbelt system for restraining vehicle occupants in the event of a crash, and the circuit 10 is particularly compatible with such a seatbelt system which includes an interlock system which prevents the starting of the engine of the motor vehicle if the seatbelts are not properly fastened about the vehicle occupants.

The control circuit 10 includes a DC source of electrical energy 12, which may be the conventional vehicle storage battery, having its negative supply lead 14 connected to ground and having its positive lead 16 connected through a current-limiting resistor 18 to a positive voltage supply lead 20. A zener diode 22 has its cathode connected to the voltage supply lead 20 and has its anode connected to the ground lead 14. The zener diode 22 provides a regulated DC voltage between the supply leads 20 and 14 for the remainder of the circuitry hereinafter described. A capacitor 24 is connected in parallel with the zener diode 22 and across the supply leads 20 and 14 to absorb or reduce voltage transients which may occur and to provide a smoothing or filtering of the supply voltage.

A current limiting resistor 26 has one of its leads connected to the positive voltage supply lead 20 and has its other lead connected to one terminal of the driver's seat switch 28. The other terminal of the driver's seat switch 28 is connected to the ground lead 14. This switch 28 is conventionally included in a seatbelt interlock system and is in an open condition when the driver's seat in a motor vehicle is unoccupied and closed when such seating position is occupied. Similarly, a resistor 34 has one of its terminals connected to the voltage supply lead 20 and has its other terminal connected through a passenger seat switch 36 to the ground lead 14. The passenger seat switch senses whether or not a passenger seating position within the motor vehicle is occupied. As is the case with the driver's seat switch 28, the passenger seat switch 36 is open when the passenger's seating position is unoccupied and is closed when the passenger's seating position is occupied.

A NAND-gate 32 has its input 30 connected to the junction formed between the current limiting resistor 26 and the driver's seat switch 28. The second input 38 of the NAND-gate 32 is connected to the junction formed between the current limiting resistor 34 and the passenger seat switch 36. The NAND-gate 32 receives its voltage supply via leads, 40 and 42 connected, respectively, to the positive and negative voltage supply leads 20 and 14.

The output of the NAND-gate 32 is supplied via an output lead 44 to the first input to a NAND-gate 53. A current limiting resistor 46 has one of its terminals connected to the positive voltage supply lead 20 and has its other terminal connected to one pole of a transmission switch 48, the other pole of which is connected to the ground lead 14. The junction formed between the transmission switch 48 and the current limiting resistor 46 forms the second input, via input lead 50, to the NAND-gate 53. The transmission switch 48 preferably, in the case of a motor vehicle having an automatic transmission for providing motive power to the drive wheels of the vehicle, is in an open condition when the transmission or its control mechanism is in a "park" position and is closed otherwise. In the case of a vehicle having a manual transmission, the transmission switch 48 may be open in a "neutral" transmission or control mechanism position and otherwise closed. In a vehicle having an automatic transmission, the transmission switch 48, if desired, may be in an open condition when the transmission is in either a "park" or "neutral" position. Also, the transmission switch 48 may be replaced by some other switching means for indicating a predetermined vehicle condition, such as a switch indicative of a vehicle speed below a predetermined level, for example, five miles per hour. Such speed sensitive switches, both electronic and electromechanical, are well known to those skilled in the art. Furthermore, the term "transmission switch" is to be broadly construed and, for example, the transmission switch 48 may be a switch placed in an open condition upon actuation of a parking brake, such actuation limiting the transmission of motive power to the vehicle drive wheels.

The NAND-gate 53 receives its voltage supply via leads 52 and 54 connected, respectively, to the voltage supply leads 20 and 14. The output 56 of the NAND-gate 53 is connected to the input of an inverter 58. The inverter 58 preferably is of the commercially available MOSFET type. Leads 62 and 60 connect the inverter 58 across the voltage supply leads 20 and 14. Also, the output lead 64 of the inverter 58 is connected to the base of an NPN transistor 65. The collector of the transistor 65 is connected to the positive voltage supply lead 20 and its emitter is connected via a lead 66 to parallel-connected solenoids 70 and 72. A magnetic field dissipation diode 68 has its cathode connected to the emitter lead 66 and its anode connected to the ground lead 14 so that the diode 68 is in parallel with the solenoids 70 and 72 to dissipate their stored magnetic energy when the transistor 65 is rendered non-conductive isolating them from the voltage supply lead 20.

The solenoid 70 is associated with the driver's seatbelt retractor and has the function of, when energized, rendering inoperative means included within the driver's seatbelt retractor for preventing, after initial seatbelt withdrawal and a decrease of the withdrawal force or upon slight retraction of the seatbelt, further withdrawal of the seatbelt from the retractor. Preferably, the solenoid 70, when energized, renders a locking mechanism in the seatbelt retractor for the driver's seating position inoperative and renders the retractor free-wheeling. The solenoid 72 is associated with the seatbelt retractor for a passenger seating position within the motor vehicle, and when energized, renders the locking mechanism of the passenger retractor inoperative and renders such retractor free-wheeling.

FIG. 2 of the drawing includes a truth table for indicating the voltage or logic signals which occur in the circuit shown in schematic form in FIG. 1. The switches 28, 36 and 48 are indicated as having a zero logic condition when closed and a 1 logic condition when open. The voltage $V_o$, which is the voltage across the parallel-connected solenoids 70 and 72, is a 0 level at low $V_o$ voltage, such as occurs when the transistor 65 is non-conductive in its collector-emitter output circuit, and is a 1 or high voltage level when the output voltage $V_o$ is high, such as occurs when the output circuit of the transistor 65 is fully conductive to apply substantially the full positive voltage on the supply lead 20 to the upper terminals of the solenoids 70 and 72.

The function of the inverter 58 and the transistor 65 is to provide power amplification of the output signal occurring on the output lead 56 of the NAND-gate 53. When the output on the lead 56 is at a high or 1 logic level, the inverter 58 has a 0 or low voltage level on its output lead 64. When the output circuit of the inverter 58 is at this low voltage level, the base of the transistor 65 is connected to substantially ground potential and the transistor 65 is nonconductive in its collector-emitter output circuit to produce a zero or low voltage level signal on the upper terminals of the solenoids 70 and 72. Thus, the solenoids 70 and 72 are de-energized when the transistor 65 is non-conductive.

On the other hand, if the logic voltage signal at the output 56 of the NAND-gate 53 is a 0 or low voltage level, then the inverter 58 has a 1 or high voltage level on its output lead 64. This supplies the base-emitter drive for the transistor 65, and renders this transistor conductive in its collector-emitter output circuit. Thus, when the output signal at the lead 56 of the NAND-gate 53 is a 0, then the transistor 65 is fully conductive in its output circuit to provide a 1 or high level voltage signal $V_o$ across the solenoids 70 and 72 supplying them with sufficient energization current to render the driver's and passenger's seatbelt retractors in a free-wheeling condition.

The NAND-gate 53 has a 0 level signal at its output 56 whenever both of its inputs 44 and 50 have logic 1 signals applied to them. The input 50 is at a 1 logic level whenever the transmission switch 48 is open, this preferably being the condition of the transmission system 48 when the vehicle's transmission is in a park or neutral condition and the vehicle's transmission is unable to supply motive power.

The input 44 to the NAND-gate 53 is the output of the NAND-gate 32. This output 44 is at a logic 1 level if either of the inputs 30 or 38 to the NAND-gate 32 is at a logic 0 condition. The input 30 to the NAND-gate 32 is at a logic 0 condition if the driver's seat switch 28 is closed, as occurs when the driver's seating position is occupied. Similarly, the input 38 to the NAND-gate 32 is at a logic 0 condition if the passenger's seat switch 36 is closed, as occurs when the passenger's seating position is occupied. Thus, a logic 1 appears on the output lead 44 of the NAND-gate 32 when either the driver's or passenger's seating position is occupied. Thus, if one of these seating positions is occupied and the transmission switch 48 is open, the NAND-gate 53 has a logic 0 voltage level at its output 56. This logic 0 level signal is inverted by the inverter 58 and power amplified by the transistor 65 and voltage and current are supplied to the solenoids 70 and 72 to render the driver's and passenger's seatbelt retractors free-wheeling and unlocked. This permits the seatbelts to be fastened easily by the vehicle occupants and eliminates annoyance to them in that the retractor mechanism cannot lock while they are attempting to fasten their seatbelts.

It should be noted that the solenoids 70 and 72 are only energized if a seating position is occupied and the transmission switch is in the appropriate condition. The solenoids 70 and 72 are de-energized if the transmission switch 48 is closed by the vehicle's transmission being placed in a condition to supply motive power to the drive wheels of the vehicle. If the switch 48 is sensitive to vehicle speed or the like, rather than to the condition of the vehicle's transmission, then the solenoids 70 and 72 are de-energized at vehicle speeds in excess of a predetermined level.

The fact that the solenoids 70 and 72 are energized only when the seating positions are occupied is important in that the gate circuits 32 and 53 and the inverter 58 are supplied directly from the vehicle's DC source of electrical energy 12 and therefor provide a current drain on this energy source even though the vehicle's ignition switch may be off. Preferably, the current flowing through the resistor 18, that is, the current drain of the circuit 10, when the solenoids 70 and 72 are de-energized, is less than 0.5 ma. This small current drain may be obtained by the use of MOS devices for the NAND-gate components 32 and 53 and for the inverter 58.

The seat sensing switches 28 and 36 and the transmission switch 48 operating as hereinabove described, typically are provided in currently used seatbelt interlock modules for motor vehicles. It is contemplated that the available switches in the current interlock system would be utilized in the circuit 10 and that many of the components of the circuit 10 would be included in the integrated circuit conventionally used in the conventional seatbelt interlock system.

Based upon the foregoing description of the invention what is claimed is:

1. In combination with a vehicle having a seatbelt system which utilizes a seatbelt retractor that permits withdrawal of the seatbelt from the retractor and that includes means for preventing further withdrawal of said seatbelt upon decrease of the withdrawal force or upon slight retraction of the seatbelt, the improvement which comprises circuit means for rendering said withdrawal preventing means inoperative when the vehicle seating position for which said seatbelt retractor is provided is occupied and said vehicle is in a condition preventing the transmission of motive power to its drive wheels.

2. In a motor vehicle having a transmission for transmitting motive power to its drive wheels and having a seatbelt system which utilizes a seatbelt retractor that permits withdrawal of a seatbelt from the retractor and that includes means for preventing further withdrawal of said seatbelt upon decrease of the withdrawal force or upon slight retraction of the seatbelt, the improvement which comprises: circuit means for rendering said withdrawal preventing means inoperative under predetermined circumstances, said circuit means including switch means for sensing the occupancy of the seating position for which said seatbelt retractor is provided, switch means for sensing a condition of said vehicle transmission wherein it is unable to transmit motive power to the drive wheels of said vehicle, a gate circuit coupled to said occupancy sensing switch means and to said transmission switch means, a solenoid associated with said seatbelt retractor and having a condition permitting operation of said withdrawal preventing means and a condition rendering said withdrawal preventing means inoperative, said solenoid being electrically coupled to the output of said gate circuit, said gate circuit placing said solenoid in its condition to render said withdrawal preventing means inoperative if said transmission is unable to transmit motive power to the drive wheels of said vehicle and said seating position is occupied.

3. In a vehicle having a transmission for supplying motive power to the drive wheels of said vehicle and having a seatbelt system including first and second seatbelt retractors, respectively, for first and second vehicle seating positions, said first and second retractors each permitting withdrawal of its associated seatbelt and including means for preventing further withdrawal upon decrease of the withdrawal force or upon slight retraction of its seatbelt, the improvement which comprises: first switch means for sensing if said first seating position is occupied; second switch means for sensing if said second seating position is occupied; a first gate circuit having first and second inputs, said first input being connected to said first switch means and said second input being connected to said second switch means, said first gate circuit having an output in a predetermined condition if either of said first or second seating positions is occupied; a second gate circuit having a first input connected to the output of said first gate circuit, and having a second input and an output; a transmission switch for sensing the inability of said vehicle transmission to supply motive power to the drive wheels of said vehicle, said transmission switch being coupled to said second input of said second gate circuit, said second gate circuit having a predetermined condition at its output when said transmission switch indicates the inability of said vehicle transmission to supply motive power and when said output of said first gate circuit is in its predetermined condition; a first solenoid associated with said withdrawal preventing means of said first retractor, said first solenoid being electrically coupled to the output of said second gate circuit; a second solenoid associated with said withdrawal preventing means of said second retractor, said second solenoid being electrically coupled to the output of said second gate circuit; said predetermined condition of the output of said second gate circuit placing said first and second solenoids in conditions rendering said seatbelt withdrawal preventing means of said retractors inoperative.

4. The improved seatbelt system of claim 3 wherein said first and second gate circuits are both NAND-gates.

5. The improved seatbelt system of claim 4 which further includes solid-state circuit means for power amplification of electrical signals appearing on said output of said second gate circuit, the output of said second gate circuit being coupled through said power amplification means to said first and second solenoids.

6. The improved seatbelt system of claim 3 wherein said first and second solenoids cannot be energized unless either said first or second seating positions are occupied.

7. In combination with a motor vehicle having a seatbelt system which utilizes a seatbelt retractor that permits withdrawal of a seatbelt from the retractor and that includes means for preventing further withdrawal of the seatbelt upon decrease of the withdrawal force or upon a slight retraction of the seatbelt, the improvement which comprises switch means for sensing the inability of said vehicle to transmit motive power to its drive wheels and circuit means, responsive to said switch means, for rendering said withdrawal preventing means inoperative when said switch means senses the inability of said vehicle to transmit motive power to its drive wheels.

8. In combination with a motor vehicle having a seatbelt system which utilizes a seatbelt retractor that permits withdrawal of a seatbelt from a retractor and that includes means for preventing further withdrawal of the seatbelt upon decrease of the withdrawal force or upon a slight retraction of the seatbelt, the improvement which comprises switch means for sensing the movement of said vehicle at speeds below a predetermined value and circuit means, responsive to said switch means, for rendering said withdrawal preventing means inoperative when said switch means senses movement of said vehicle at a speed below said predetermined value.

* * * * *